(12) United States Patent
Stryker et al.

(10) Patent No.: US 9,966,984 B2
(45) Date of Patent: May 8, 2018

(54) DEVICE CASE WITH BALANCED HINGE

(71) Applicant: Apple Inc., Cupertino, CA (US)

(72) Inventors: James A. Stryker, San Francisco, CA (US); Yoonhoo Jo, San Francisco, CA (US); Nicholas A. Treadwell, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 15/273,861

(22) Filed: Sep. 23, 2016

(65) Prior Publication Data

US 2017/0250719 A1 Aug. 31, 2017

Related U.S. Application Data

(60) Provisional application No. 62/300,724, filed on Feb. 26, 2016.

(51) Int. Cl.
*H04M 1/00* (2006.01)
*H04B 1/3877* (2015.01)
*H04B 1/3888* (2015.01)

(52) U.S. Cl.
CPC ......... *H04B 1/3877* (2013.01); *H04B 1/3888* (2013.01)

(58) Field of Classification Search
CPC .... H04B 1/3888; H04B 1/385; H04B 5/0037; H04M 1/6033
USPC ...... 455/575.1, 90.3, 575.3; 379/433.13, 454
See application file for complete search history.

(56) References Cited

U.S. PATENT DOCUMENTS

| | | | | |
|---|---|---|---|---|
| 7,495,895 B2* | 2/2009 | Carnevali | ............ | G06F 1/1626 361/679.26 |
| 8,516,645 B2* | 8/2013 | Kraemer | ............... | A46B 5/0029 15/201 |
| 9,353,558 B2* | 5/2016 | Hatton | .................... | E05C 19/10 |
| 2004/0010919 A1* | 1/2004 | Shiba | ................... | B26B 19/048 30/43.92 |
| 2007/0034725 A1* | 2/2007 | Duh | .................... | B02C 18/0007 241/236 |
| 2007/0186382 A1* | 8/2007 | Huang | ................. | G06F 1/1681 16/293 |
| 2010/0002377 A1* | 1/2010 | Kim | .................... | H04M 1/0214 361/679.55 |
| 2010/0288405 A1* | 11/2010 | Hsu | ........................ | G06F 1/1613 150/165 |
| 2014/0251368 A1* | 9/2014 | Lawson | ................. | A45C 11/00 132/287 |
| 2016/0029760 A1* | 2/2016 | Park | ....................... | A45C 11/00 224/242 |
| 2016/0066457 A1* | 3/2016 | Tien | ..................... | H04B 1/3888 206/45.2 |

(Continued)

*Primary Examiner* — Dominic Rego
(74) *Attorney, Agent, or Firm* — Dickinson Wright RLLP

(57) ABSTRACT

This application relates to a computing device case that provides some amount of torsional force in order to cancel at least some static and dynamic loads experienced by the computing device when the case is arranged as a stand. By canceling out these loads, the computing device to be angled at an almost unlimited number of angles relative to a surface on which the computing device is resting. Flexible elements in the case can resist the static and dynamic loads of the computing device, thereby allowing the computing device to receive touch inputs at almost any angle without causing the case and the computing device to collapse.

20 Claims, 10 Drawing Sheets

(56) References Cited

U.S. PATENT DOCUMENTS

2016/0070407 A1\* 3/2016 Jeon ................... G06F 1/1626
                                                345/173
2017/0050459 A1\* 2/2017 Tiguy .................. B42D 25/23

\* cited by examiner

DEVICE CASE WITH BALANCED HINGE

CROSS-REFERENCE TO RELATED APPLICATION(S)

This application claims the benefit of priority to U.S. Provisional Application No. 62/300,724, filed on Feb. 26, 2016, and titled "DEVICE CASE WITH BALANCED HINGE," the disclosure of which is incorporated herein by reference in its entirety.

FIELD

The described embodiments relate generally to computing device cases and covers. More particularly, the present embodiments relate to cases that can serve as a stand for the computing device and that provide some amount of torsional force for canceling out static and dynamic loads of the computing device when upright, or at least partially upright.

BACKGROUND

Computing devices have become increasingly portable as a result of advances in component manufacturing that have yielded more compact electronic components. Many of these computing devices include flat screens that allow for viewing digital content in almost any environment. In situations where a user may prefer a computing device to be in a static position for an extended period of time, there may be limited resources for adequately standing the computing device upright for viewing the flat screen. Moreover, certain stands may be limited to a single upright position, thereby limiting the ways a user can interact with the computing device while the computing device is being supported by the stand.

SUMMARY

This paper describes various embodiments that relate to folio cases for computing devices. In some embodiments, a case for a computing device is described. The case includes cover portions configurable as a stand for the computing device, and a flexible region between the cover portions. The flexible region is configured to provide a torsional force that counteracts at least some force exerted by the computing device when the cover portions are configured as the stand.

In other embodiments, a case configurable as a stand for a computing device is set forth. The case can include at least a first cover comprising a first flexible region and at least one cover layer disposed over the first flexible region, and a second cover connected to the first cover by at least a second flexible region. The first flexible region and the second flexible region are configured to provide torsional forces that counteract a weight of the computing device when the first cover and the second cover are arranged as the stand for the computing device.

In yet other embodiments, a system is set forth. The system includes at least a device cover configurable as both a stand and a protective cover for a computing device. The system also includes a flexible component disposed within the device cover such that the flexible component provides a torsional spring force that counteracts static and dynamic forces exerted by the computing device when the device cover is configured as the stand.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1A:
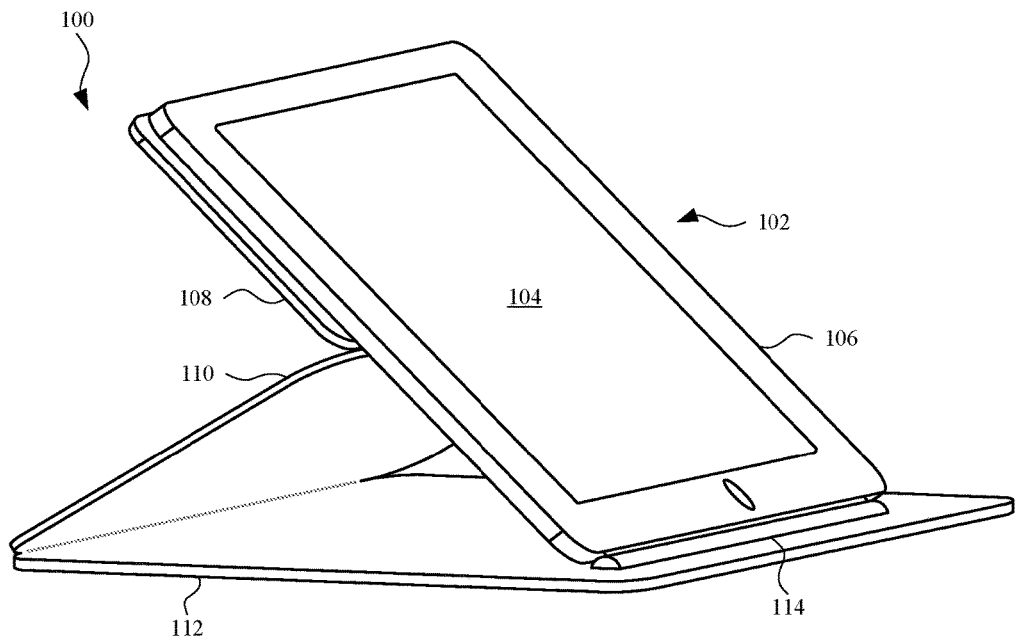
FIG. 1A illustrates a front perspective view a device cover 100 for positioning a computing device into a position suitable for viewing a display of the computing device.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Computing device cases provide a number of benefits for users who seek to protect their respective computing devices from weather, collisions, and general wear over the lifetime of the computing device. The cases discussed herein are purposed as multi-function cases that can not only protect a computing device from damage, but also provide support for the computing device when the case is operating as a stand. The cases described herein can support the computing device in multiple positions while accounting for the static load (that is, the weight) of the computing device. Further, the cases may support a dynamic load received by the computing device during use. A "dynamic load" may be referred to as a force, applied exerted on the computing device during use, such as when a user is touching the computing device. For example, in some embodiments, the case includes two cover portions configurable as a stand for the computing device. A flexible region can be connected between the two cover portions. The flexible region can provide a torsional force that counteracts at least some amount of static weight of the computing device when the two cover portions are configured as the stand.

When the case is arranged as a stand for the computing device, at least a portion or a majority of a static load of the computing device can be canceled by the case. Additionally, the dynamic loads experienced by the computing device can be at least partially canceled by mechanical features of the case. Such mechanical features can include one or more springs, and/or one or more flexible layers disposed within one or more flexible regions of the case. For example, the case can be attached to a back surface of the computing device, opposite a flat panel display of the computing device. The case can include a flexible region that includes at least one spring and/or at least one flexible layer. The flexible region can act to resist bending of the case and thereby overcome at least some of the static load of the computing device when the case and the computing device are resting on a surface. As an angle of the flexible region is increased or decreased, a torsional load on the flexible region is also increased or decreased, thereby increasing or decreasing a resistive force of the flexible region. In this way, the resistive force can assist in canceling out at least a portion of the static load. As a result, the computing device and the case can be arranged in multiple positions without the static load completely overcoming a force of friction provided by the surface on which the computing device and the case reside.

In some embodiments, the case can include a back cover for attaching to the back surface of the computing device opposite the flat panel display, and a front cover that extends around a side of the computing device and at least partially covers the flat panel display. A portion of the back cover of the case can include a first flexible region. Additionally, an area between the front cover and the back cover can include a second flexible region. Furthermore, an inside surface of the front cover, relative to the computing device, can define a surface that can receive a static load of the computing device when the case is arranged as a stand. Each of the first flexible region and the second flexible region can include at least one spring and/or at least one flexible layer. Furthermore, each of the first flexible region and the second flexible region can be arranged to cancel out at least a portion of the dynamic loads experienced by the computing device, while also canceling out a portion of the static load of the computing device. For example, the second flexible region can be arranged to cancel out more of the static load of the computing device than the first flexible region, and the first flexible region can be arranged to cancel out more of the dynamic loads than the second flexible region. Such arrangements can be accomplished by varying the tension of one or more components that make up the first flexible region and the second flexible region. Furthermore, such arrangements can be accomplished by varying an amount of friction at a surface of the case on which the static load of the computing device resides when in a standing position. Additionally, depressions can be formed into areas of the case for an edge of the computing device to rest in when the case is acting as a stand.

The flexible region can be disposed between two or more regions of the case and can be debossed at one or more surfaces of the case. In this way, any springs or flexible layers will be hidden from view when the case is enclosing the computing device. Alternatively, one or more surfaces of the case defining the flexible region can remain without a debossed area over the flexible region. The flexible region can include one or more polymer layers, composite layers, and/or metal layers. Furthermore, the flexible region can be arranged to limit creeping or other degradation of the materials of the case over time. In some embodiments, the case is debossed on one side of the case where one or more flexible regions are incorporated in order to preserve a cosmetically smooth surface on a side of the case that is not debossed. Each flexible region can be arranged to have a limited bend radius in order to prevent creases and other blemishes that can occur when bending the material(s) covering the case. For example, when the case is made from leather, imitation leather, polymer, and/or a composite material, creases in the case can become permanent over time thereby making the case weaker and prone to environmental damage. Therefore, limiting the bend radius can mitigate cosmetic artifacts that can eventually compromise the integrity of the case.

The case can be attached to the computing device by incorporating one or more rigid or flexible magnets into a region of the computing device that is to be attached the computing device, such as the front surface, the back surface, and/or a region between the front surface and the back surface. In some embodiments, the case can incorporate a rigid frame that wraps at least partially around one or more edges of the computing device in order to maintain the computing device against one or more sides of the case. In yet other embodiments, the case can merely rely on surface friction directly between the case and the computing device to ensure that the computing device remains within the case when the case is at least partially enveloping the computing device. The case can incorporate one or more shims for improving the structural rigidity of the case at the back cover and/or front cover of the case. In some embodiments, the front cover of the case can remain flexible (even without a flexible element), thereby allowing the front cover to fold away, similar to a paperback book cover or magazine cover. The case can include conductive pathways embedded within the case in order to communicate signals to and from the computing device. For example, the case can include a keyboard, speakers, microphone, touch pad, camera, and/or any electrical component suitable for communicating with a computing device. Signals from the electrical components can be relayed through the conductive pathways in the case and arrive at the computing device. Such electrical components can be powered by an external power source relative to the case (e.g., the battery of the computing device attached to the case or a power plug attached to an electrical outlet and the case). Alternatively, the electrical components can be powered by an inductive power source that transmits wireless power signals to an inductor embedded in the case. The inductive power source can be attached to one or more electrical components embedded in the computing device.

These and other embodiments are discussed below with reference to FIGS. 1A-9. However, those skilled in the art will readily appreciate that the detailed description given herein with respect to these figures is for explanatory purposes only and should not be construed as limiting.

FIG. 1A illustrates a front perspective view a device cover 100 for positioning a computing device 102 into a position suitable for viewing a display 104 of the computing device 102. The computing device 102 may include a tablet computing device, or a mobile communication device, such as a smartphone. The display 104 is designed to prevent visual information to a user in the form of textual information, still images, and/or video. Also, the display 104 may include a touch-sensitive layer that allows the display 104 to receive touch inputs used to provide a control or command to the display 104. The computing device 102 may further include an enclosure 106 that receives the display 104 and several internal components (not shown), such as processor circuits, memory circuits, speakers, and batteries, as non-limiting examples. The enclosure 106 may include a metal, such as aluminum. In order to support the computing device 102, the device cover 100 may include multiple sections. For example, the device cover 100 may include a first back cover 108 and a second back cover 110. The first back cover 108 and the second back cover 110 may combine to support the computing device 102. For example, the first back cover 108 and the second back cover 110 can provide support for the computing device 102 when the computing device 102 is receiving a touch input at the display 104. Also, the device cover 100 may include a front cover 112 positioned below the computing device 102. The front cover 112 may include a bumper 114 designed to engage the computing device 102. Due in part of the arrangement of the device cover 100, the bumper 114 defines the only position that the device cover 100 can be arranged to support the computing device 102 in an upright position, as shown in FIG. 1A.

Figure 1B:
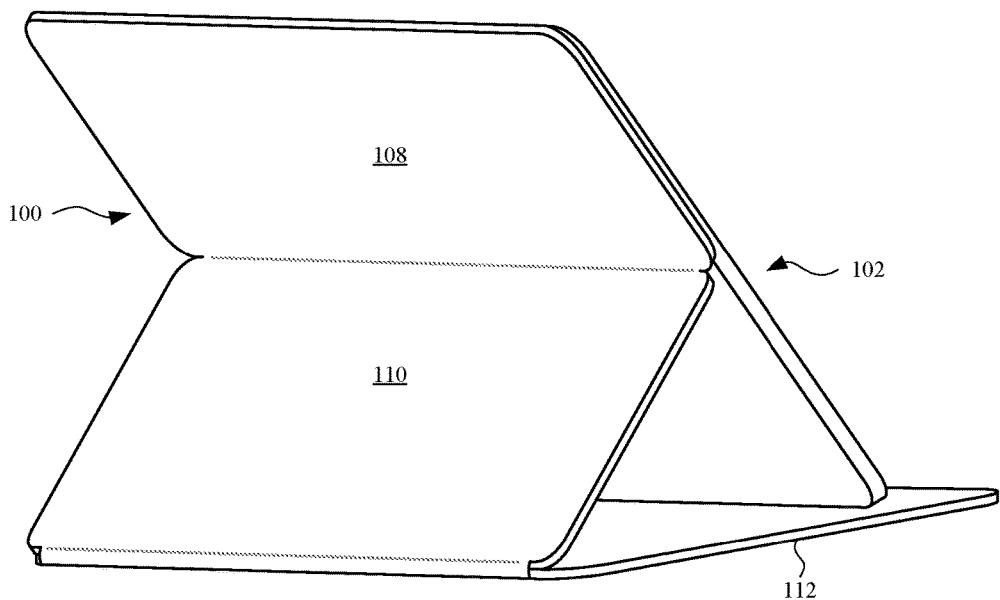
FIG. 1B illustrates a rear perspective view of the device cover shown in FIG. 1A.

FIG. 1B illustrates a rear perspective view of the device cover 100 shown in FIG. 1A. As shown, the first back cover 108 is pivotally connected to the second back cover 110 such that the first back cover 108 may rotate with respect to the second back cover 110, and vice versa. Also, the front cover 112 pivotally connected to the second back cover 110 such that the second back cover 110 may rotate with respect to the second back cover 110, and vice versa.

The arrangement of the computing device 102 and the device cover 100 illustrated in FIGS. 1A and 1B is the only arrangement where this is possible. For example, if the computing device 102 was not resting against the bumper 114 (shown in FIG. 1A), the computing device 102 may tip over and cause both the first back cover 108 and the second back cover 110 to collapse in response to a touch input at the display 104. This is in part due to a lack of components in the device cover 100 that can create a torsional force and resist static and dynamic loads exhibited by the computing device 102 when the computing device 102 is at least partially upright.

Figure 2A:
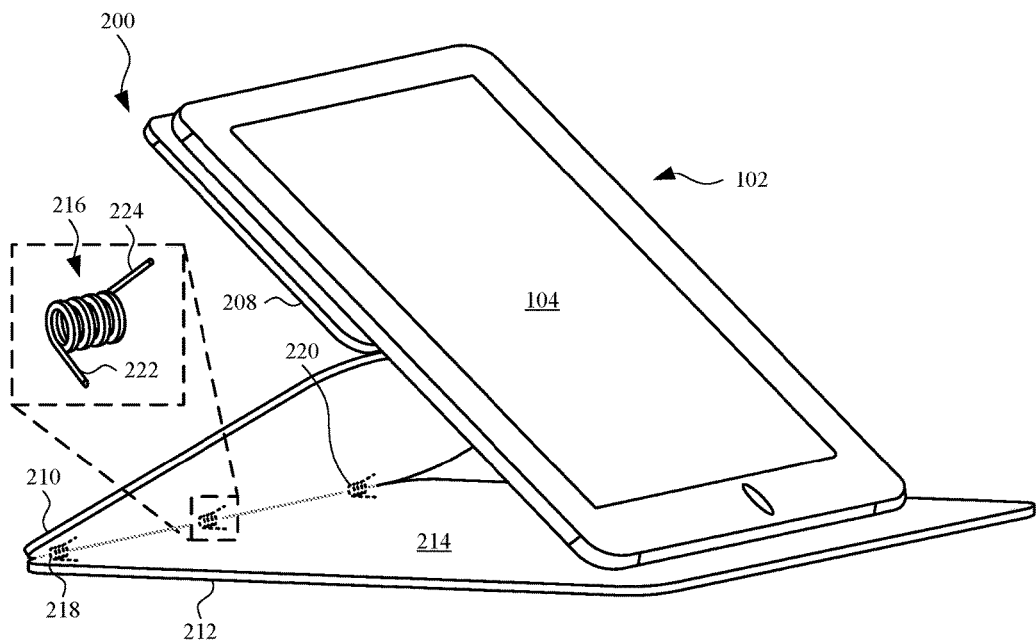
FIG. 2A illustrates a front perspective view of an embodiment of a case, in accordance with some described embodiments.

FIG. 2A illustrates a front perspective view of an embodiment of a case 200, in accordance with some described embodiments. As shown, the case 200 may couple with and support the computing device 102. Further, the case 200 is designed to resist static loads (such as the weight of the computing device 102), as well as dynamic loads (including touch inputs to the display 104). Each of these loads may be exerted on the case 200 as a result of the computing device 102 being positioned in an at least partially upright position, as shown in FIG. 2A.

The case 200 can include a front cover 212 that includes an interior surface 214 that can be made from material that provides some amount of friction to resist the movement of an edge of the computing device 102 in contact with the interior surface 214, as shown in FIG. 2A. Additionally, the case 200 can include one or more covers that can act as a stand for the computing device 102 when the computing device is arranged in an at least partially upright position. For example, the case 200 can include a first back cover 208 and a second back cover 210 connected with the first back cover 208, with the first back cover 208 and the second back cover 210 supporting the computing device 102.

The second back cover 210 may be pivotally coupled with the front cover 212. Although not shown, the front cover 212 is design to rotate with respect to the second back cover 210 such that the front cover 212 can be positioned over the computing device 102, and in particular, the display 104. The case 200 may include several flexible elements embedded in the second back cover 210 and the front cover 212. For example, the case 200 may include a first torsional element 216, a second torsional element 218, and a third torsional element 220. As shown in the enlarged view, the first torsional element 216 may resemble a spring with a first end 222 and a second end 224 embedded in the front cover 212 and the second back cover 210, respectively. The first torsional element 216 can include springs made from a metal or plastic, and having at least two ends that terminate in a substantially straight orientation. The second torsional element 218 and the third torsional element 220 may include any feature(s) described for the first torsional element. Also, the first torsional element 216, the second torsional element 218, and the third torsional element 220 may represent a first flexible region (between the second back cover 210 and the front cover 212) of the case 200.

The aforementioned torsional elements may combine to cancel out at least some, and in some cases all, of the static and dynamic loads associated with the computing device 102. Also, at least a portion of the torsional elements can be disposed within the case 200 such that the torsional elements are hidden from the sight of a user. For example, a layer of material such as leather, imitation leather, composite material, rubber, and/or any other material suitable for attaching to a case (such as the case 200) can be disposed around the case 200 to at least partially envelope the case 200. The layer of material can be attached to the first back cover 208, the second back cover 210, and/or the front cover 212.

Figure 2B:
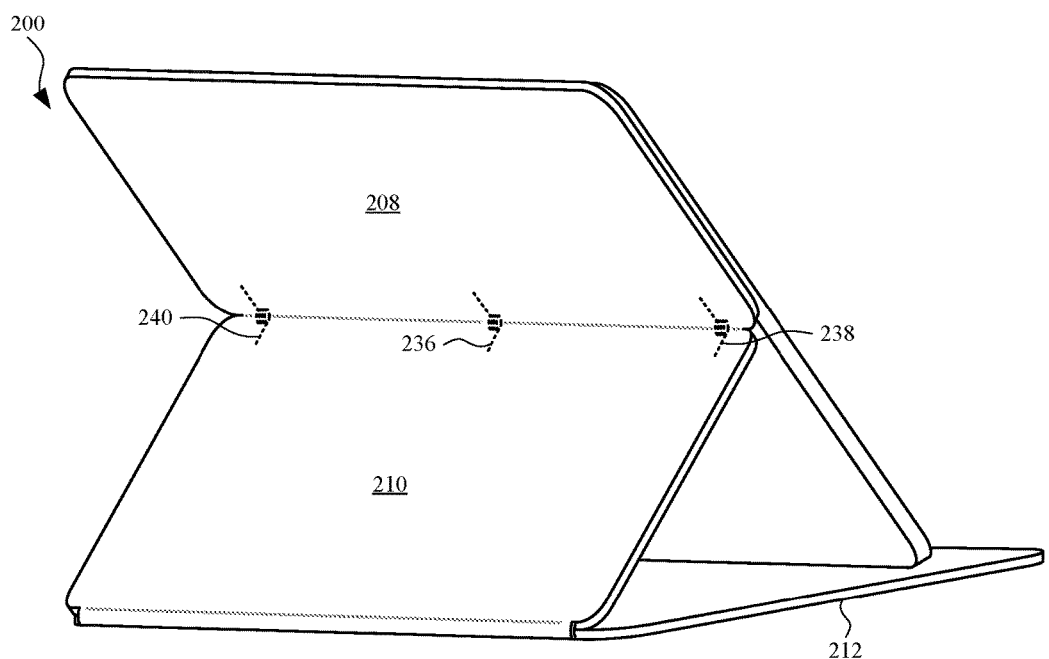
FIG. 2B illustrate a rear perspective view of the case shown in FIG. 2A, showing additional torsional elements of the case.

FIG. 2B illustrate a rear perspective view of the case 200 shown in FIG. 2A, showing additional torsional elements of the case 200. As shown, the case 200 may include torsional elements that extend into the first back cover 208 and the second back cover 210. For example, the case 200 may include a first torsional element 236, a second torsional element 238, and a third torsional element 240, with each of the torsional elements extending into both the first back cover 208 and the second back cover 210. Similar to the torsional elements extending into both the second back cover 210 and the front cover 212, the first torsional element 236, the second torsional element 238, and the third torsional element 240 may combine to cancel out at least some, and in some cases all, of the static and dynamic loads associated with the computing device 102. Also, the layer(s) of material that cover the include the first torsional element 216, the second torsional element 218, and the third torsional element 220 may also cover the first torsional element 236, the second torsional element 238, and the third torsional element 240. Also, the first torsional element 236, the second torsional element 238, and the third torsional element 240 may represent a second flexible region (between the first back cover 208 and the second back cover 210) of the case 200.

Figure 3A:
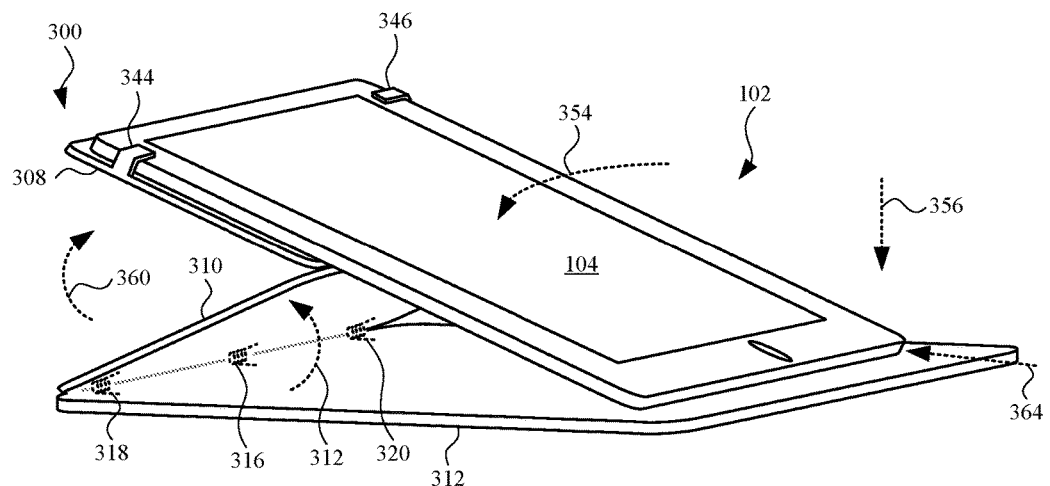
FIG. 3A is a front perspective of an embodiments of a case, in accordance with some described embodiments.

FIG. 3A is a front perspective of an embodiments of a case 300, in accordance with some described embodiments. The case 300 may include any material(s) or feature(s) previously described for the case 200, shown in FIGS. 2A and 2B. As shown, the case 300 may include a first back cover 308, a second back cover 310, and a front cover 312. Further, in order to secure the computing device 102 with the case, the first back cover 308 may include latching elements, such as a first latching element 344 and a second latching element 346. However, the number of latching elements may vary. Also, the case may include multiple torsional elements that form flexible regions, with the torsional elements designed to support the computing device 102. This will be discussed below.

The case 300 is designed to support the computing device 102, even when the computing device 102 is at least partially upright, as shown in FIG. 3A. For instance, a user may provide a touch input that results in a touch force 354 against the computing device 102 and specifically, against the display 104. At least a portion of the touch force is transferred to the front cover 312 and to each of the first back cover 308 and the second back cover 310. In order to at least partially or fully cancel the touch force, the case 300 includes a flexible region. As shown in FIG. 3A, the case 300 includes a first torsional element 316, a second torsional element 318, and a third torsional element 320, each of which may extend into both the second back cover 310 and the front cover 312. These torsional elements may define in part a joint of a flexible region between the second back cover 310 and the front cover 312, and may include any material or feature previously described for a torsional element.

Figure 3B:
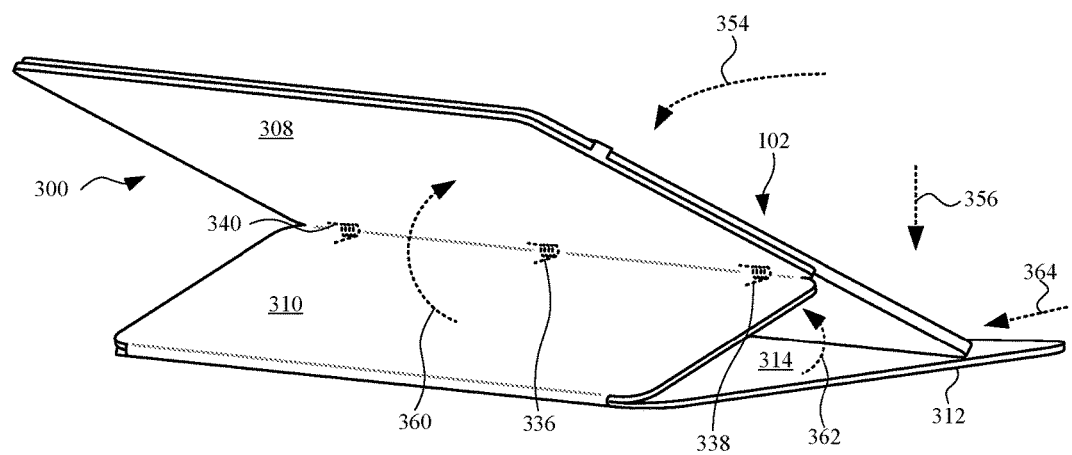
FIG. 3B illustrates a rear isometric view of the case shown in FIG. 3A, further showing additional torsional elements, such as a first torsional element, a second torsional element, and a third torsional element.

The case 300 may include an additional flexible region. For example, FIG. 3B illustrates a rear isometric view of the case 300 shown in FIG. 3A, further showing additional torsional elements, such as a first torsional element 336, a second torsional element 338, and a third torsional element 340. These torsional elements may define in part a joint at the additional flexible region between the first back cover 308 and the second back cover 310, and may include any material or feature previously described for a torsional element. The flexible region between the first back cover 308 and the second back cover 310 create a first torsional force 360 (also shown in FIG. 3A) that can cancel out at least a portion of the touch force 354. Furthermore, when the computing device 102 is at least partially upright, a static force 356 from the weight of the computing device 102 can be transferred to the first back cover 308, the second back cover 310, and the front cover 312. In order to at least partially cancel the static force 356 (also shown in FIG. 3A), the flexible region connected at a joint between the front cover 312 and the second back cover 310 can provide a second torsional force 362. The second torsional force 362 can at least partially or fully cancel the static force 356, thereby allowing the computing device 102 to be arranged in nearly an unlimited number of angles relative to an interior surface 314 of the front cover 312. For example, the computing device 102 can be arranged at a 90-, 65-, 45-, and 15-degree angle, as non-limiting examples, relative to the interior surface 314 without the static force 356 overcoming the second torsional force 362 and causing the first back cover 308 and the second back cover 310 to collapse. Furthermore, because the first torsional force 360 cancels out a majority of the touch force 354, a user can interact with the display 104 (shown in FIG. 3A) at any angle of the computing device 102 without having to worry about the computing device 102 falling down. In some embodiments, in order to mitigate any opportunity for the computing device 102 to overcome a force of friction 364 (also shown in FIG. 3A) provided by the interior surface 314, the surface friction of the interior surface 314 can be increased. For example, the surface friction of the interior surface 314 can be higher than an exterior surface friction of the case 300 in order to provide a smoother surface on an exterior of the case 300 compared to the interior surface 314.

Figure 4A:
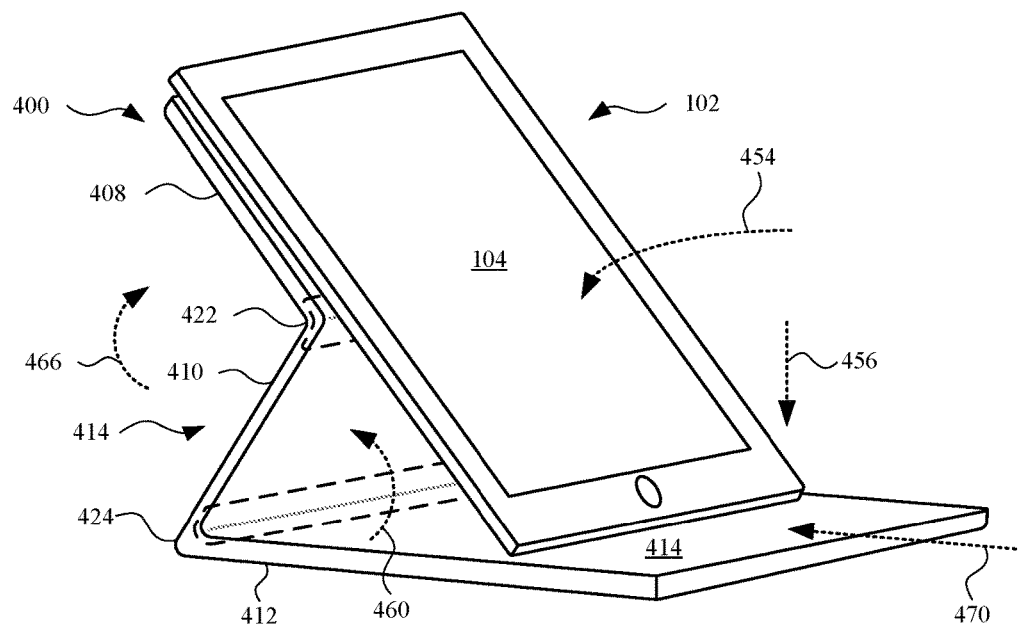
FIG. 4A illustrate a front perspective view of an embodiment of a case that includes alternate flexible regions, in accordance with some described embodiments.

FIG. 4A illustrate a front perspective view of an embodiment of a case 400 that includes alternate flexible regions, in accordance with some described embodiments. As shown, the case 400 may include a first back cover 408 and a second back cover 410, with a first flexible region 422 defining a joint between the first back cover 408 and the second back cover 410. The case 400 may include a front cover 412 connected with the second back cover 410, with a second flexible region 424 defining a joint between the second back cover 410 and the front cover 412. Each of the first flexible region 422 and the second flexible region 424 can incorporate one or more flexible layers (shown as dotted lines) for supporting the computing device 102 in one or more upright arrangements. For example, the first flexible region 422 can create a first torsional force 466 that at least partially cancels a touch force 454 that can be provided by a user at the display 104. Additionally, the second flexible region 424 can create a second torsional force 460 that at least partially cancels a static force 456 created in part by a weight of the computing device 102. In this way, a user is able to fold the case 400 into any suitable arrangement for supporting the computing device 102 in an upright position without having to worry about a touch force 454 or touch gesture causing the computing device 102 to move or collapse. Furthermore, an interior surface 414 of the front cover 412 can include a surface made from a material that creates a force of friction 470 that prevents the computing device 102 from slipping across the interior surface 414.

Figure 4B:
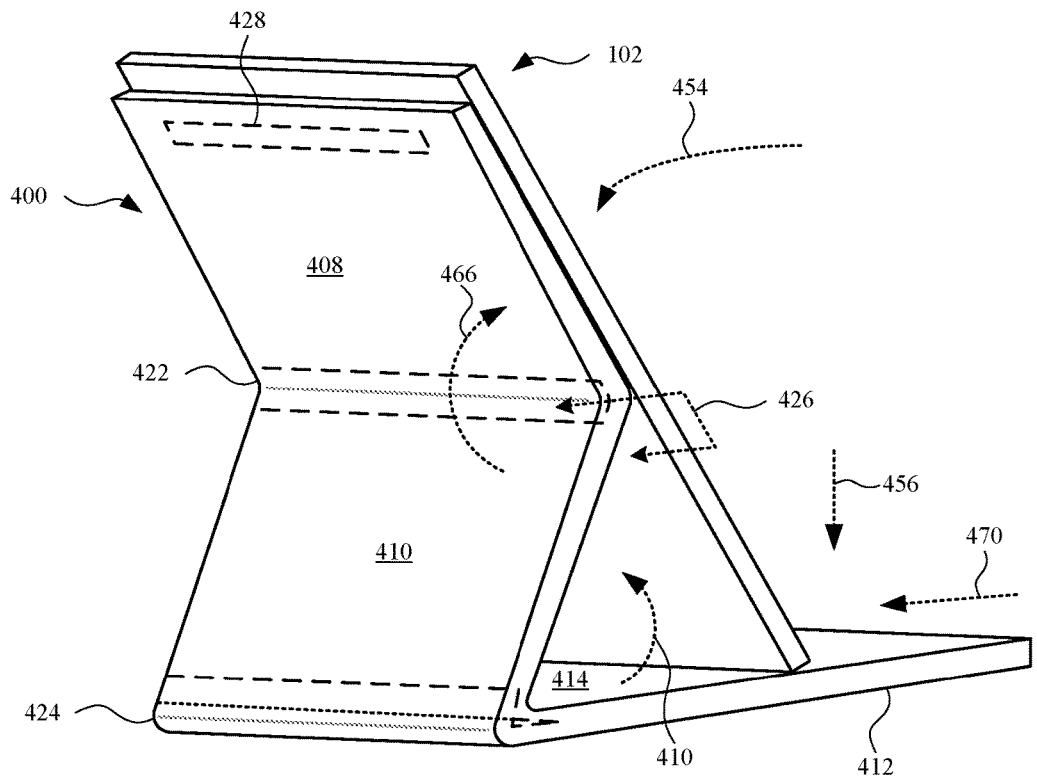
FIG. 4B illustrates a rear isometric view of the case shown in FIG. 4A.

FIG. 4B illustrates a rear isometric view of the case 400 shown in FIG. 4A. As shown, the first flexible region 422 can extend across (and between) the first back cover 408 and the second back cover 410, while the second flexible region 424 can extend across (and between) the second back cover 410 and the front cover 412. Although a discrete number of flexible regions is shown, in some embodiments, the case 400 can have more than two flexible regions. For example, the case 400 can have at least two non-parallel flexible regions disposed within the case 40. Also, in some embodiments, the case 400 includes a magnet 428 disposed within the first back cover 408. The magnet 428 may be used to secure the computing device 102 with the case 400 by way of magnetic attraction between the magnet 428 and a magnetic element or magnetically attractable material (not shown) disposed in the computing device 102. Any of the magnets discussed herein can include particles of neodymium, niobium, iron, and/or any other rigid or flexible magnetic material. Also, although not shown, the first back cover 408 may include two or more magnets. Also, although not shown, the second back cover 410 may include a magnet that magnetically couples with a magnetic element or magnetically attractable material (not shown) disposed in the computing device 102.

The case 400 can include one or more layers of leather, imitation leather, microfiber, composite, plastic, rubber, metal, and/or any other material suitable for forming into a case for a computing device. One or more layers of flexible material can be disposed within the case 400 to create the first flexible region 422 and the second flexible region 424. The first flexible region 422 and/or the second flexible region 424 can be debossed on one or more sides of the case 400 where the first flexible region 422 and/or the second flexible region 424 reside. Further description of the flexible region is described herein, especially respect to FIG. 5, which illustrates a cross sectional view of the first flexible region 422 taken from a cross sectional cutaway 426 of the case 400 along the first flexible region 422.

FIGS. 5A-5D illustrate cross sectional views corresponding to the flexible regions discussed herein. For example, the cross sectional views shown and described in FIGS. 5A-5D can correspond to a cross section of the first flexible region 422 identified at the cross sectional cutaway 426 of FIG. 4B. However, it should be noted that the cross sectional views can correspond to any of the flexible regions, such as the second flexible region 424 (shown in FIGS. 4A and 4B), described with respect to any of the cases discussed herein.

Figure 5A:
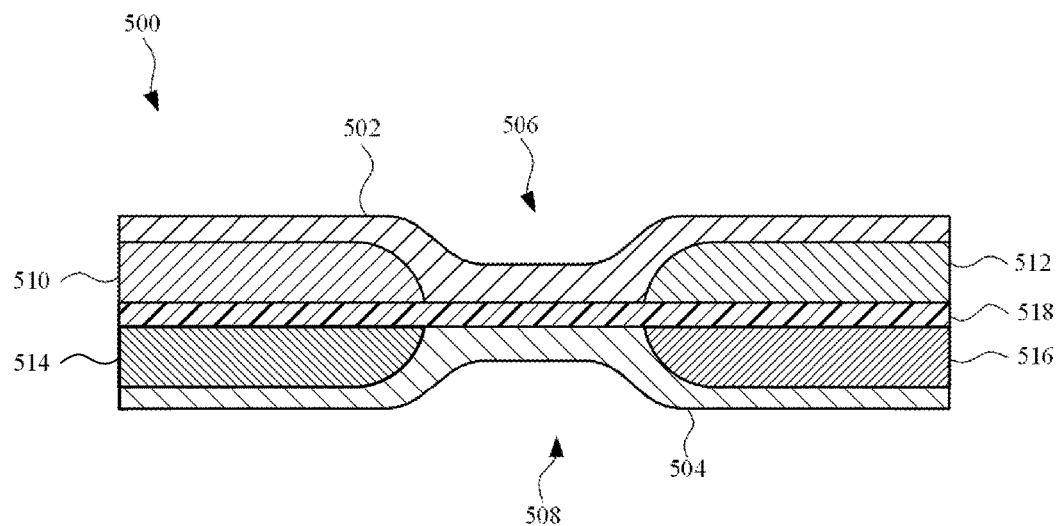
FIG. 5A illustrates a cross sectional view of a flexible region of a case.

FIG. 5A illustrates a cross sectional view of a flexible region 500 of a case. The flexible region 500 can include a first layer 502 that can be made from leather, imitation leather, microfiber, plastic, metal, and/or any other material for forming a case. The flexible region 500 can also include a second layer 504 that can be made from the same material as the first layer 502 or a different material. For example, the first layer 502 can be made from leather or imitation leather, and the second layer 504 can be made from a microfiber or synthetic material. The first layer 502 can correspond to an outer layer that is most visible to a user of a case (such as the case 400 shown in FIG. 4A) and a computing device (such as the computing device 102 shown in FIG. 4A). The second layer 504 can be a layer that abuts a computing device when the computing device is disposed with the case corresponding to the flexible region 500. Also, the first layer 502 and the second layer 504 can also include a first embossed portion 506 and a second embossed portion 508, respectively. The first embossed portion 506 may separate a first panel 510 from a second panel 512 (both used to form a case), while the second embossed portion 508 may separate a third panel 514 from a fourth panel 516 (both used to form a case). Also, the flexible region 500 may further include a flexible component 518. The flexible component 518 can be made from any material suitable for acting as a spring or flexible joint between two panels. For example, the flexible component 518 can be made from any material that exhibits some amount of tension and can form back into an original shape after experiencing some amount of tension. Such materials can include plastic, rubber, foam, elastomer, metal, and/or any other synthetic or non-synthetic material. In some embodiments, the flexible component 518 can span an entire width of each of the aforementioned panels or only between portions of the panels. In yet other embodiments, the flexible component 518 is not disposed between the panels and is only disposed between the first embossed portion 506 and the second embossed portion 508.

Figure 5B:
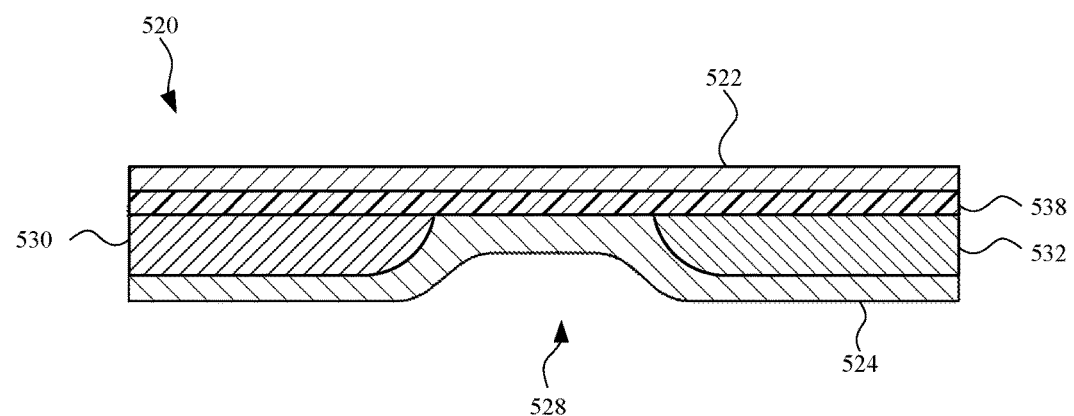
FIG. 5B illustrates another embodiment of a flexible region that can be included in any of the cases described herein.

FIG. 5B illustrates another embodiment of a flexible region 520 that can be included in any of the cases described herein. The embodiment of FIG. 5B includes a first layer 522 and a second layer 524, similar to the first layer 502 and the second layer 504, respectively, described with respect to FIG. 5A. However, in FIG. 5B, only the second layer 524 includes a debossed portion 528. Additionally, the flexible region 520 includes panels, such as a first panel 530 and a second panel 532, only between the second layer 524 and a flexible component 538, which may include any material(s) previously described for the flexible component 518 (shown in FIG. 5A). Further, the debossed portion 528 in the second layer 524 may define a hinge between the first panel 530 and the second panel 532. The first panel 530 and the second panel 532 can be defined by one or more plastic or metal shims disposed within a case (such as the case 400, shown in FIG. 4A). The first panel 530 and the second panel 532 can be adhered or molded to the flexible component 538. Furthermore, the flexible component 538 can be formed as a single piece with the first panel 530 and the second panel 532, such that the flexible component 538 is a less thick region compared to the first panel 530 and the second panel 532.

Figure 5C:
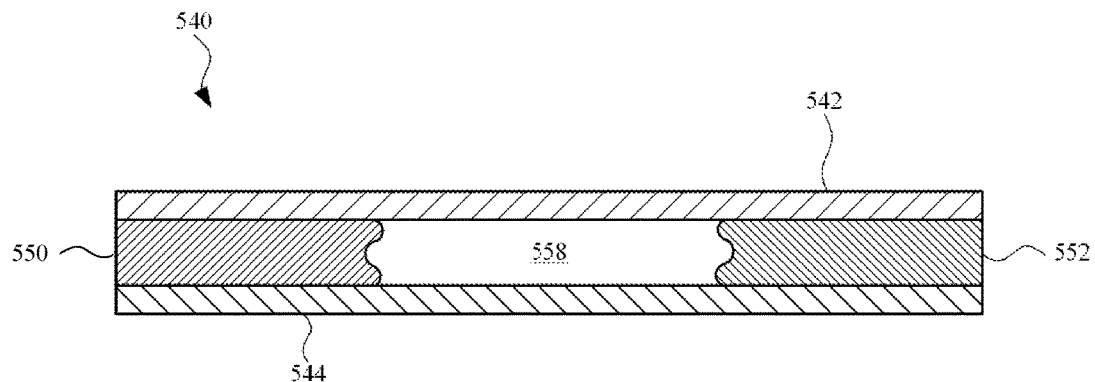
FIG. 5C illustrates yet another embodiment of a flexible region that can be included in any of the cases described herein.

FIG. 5C illustrates yet another embodiment of a flexible region 540 that can be included in any of the cases described herein. The embodiment of FIG. 5C includes a first layer 542 and a second layer 544, similar to the first layer 502 and the second layer 504, respectively, described with respect to FIG. 5A. However, the first layer 542 and the second layer 544 in FIG. 5C may not include a debossed portion. In this way, a cosmetically smooth and flat surface can be seen on both sides of the flexible region 540. Additionally, the flexible region 540 can include a first panel 550 and a second panel 552 that combine (with the first layer 542 and the second layer 544) to surround a flexible component 558. The flexible component 558 can be made from the same material as the flexible component 518 of FIG. 5A. However, the flexible component 558 can have distal ends that are disposed adjacent to distal ends of the first panel 550 and the second panel 552 in order to create a surface of uniform thickness over the flexible region 540. Alternatively, the flexible component 558 can be configured to at least partially reside within a portion of the first panel 550 and/or the second panel 552 in order to lock the flexible component 558 in place.

Figure 5D:
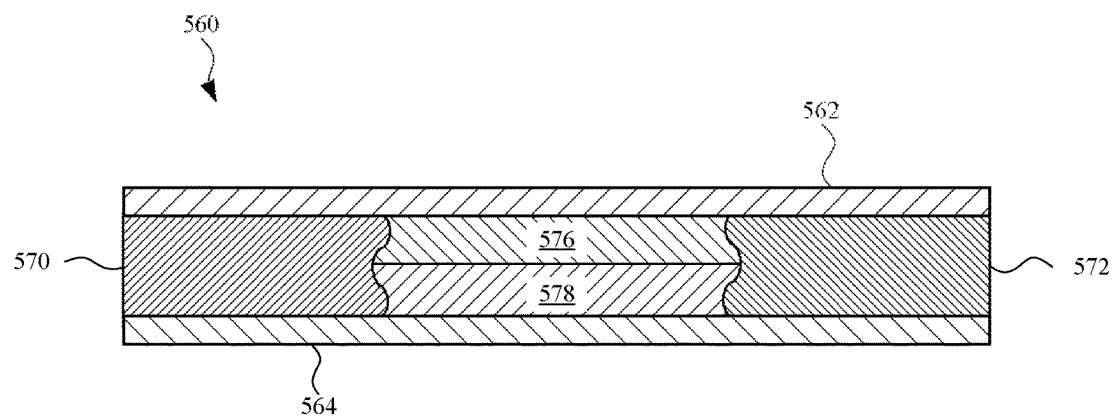
FIG. 5D illustrates another embodiment of a flexible region that can be included in any of the cases described herein.

FIG. 5D illustrates another embodiment of a flexible region 560 that can be included in any of the cases described herein. The flexible region 560 may include a first layer 562 and a second layer 564, similar to the first layer 502 and the second layer 504, respectively, described with respect to FIG. 5A. The flexible region 560 may further include a first panel 570 and a second panel 572 that combine (with the first layer 562 and the second layer 564) to surround a frictional layer 576 and the flexible component 578. The flexible component 578 can act as an elastic joint between the first panel 570 and the second panel 572. The frictional layer 576 can act as a clutch that can bend into any angle and resist deformation out of an angle into which the frictional layer 576 is bent. The frictional layer 576 can be a clutch assembly that includes at least one joint that resists rotation but allows for some amount of rotation. In this way, the flexible region 560 can be deformed or rotated into any angle while still resisting some amount of static and/or dynamic loads exerted by a computing device (such as the computing device 102, shown in FIG. 4A) at any angle of the computing device. In some embodiments, the frictional layer 576 can be made from a plastic, metal, and/or any other material that can bent from a flat position into an angled position, and resist deformation once in the angled position. In this way, the flexible region 560 can be bent into an angled position, such as the position of the first flexible region 422 (shown in FIG. 4B), and counteract dynamic loads (e.g., the touch force 454, shown in FIG. 4B), and also be bent into a flat position, such as the position of the front cover 412 of the case 400 (FIG. 4B), and resist bending out of the flat position. In some embodiments, when the flexible region 560 is in the angled position and/or in the flat position, a static force of the frictional layer 576 can be greater than a static force of the flexible component 578. As a result, the flexible region 560 can remain, or tend to remain, in any shape or angle corresponding to the frictional layer 576. The flexible region 560 can be incorporated into the case 400 (shown FIGS. 4A and 4B) at the first flexible region 422 and/or the second flexible region 424, to assist in counteracting both static and dynamic loads exerted by the computing device 102.

Figure 6A:
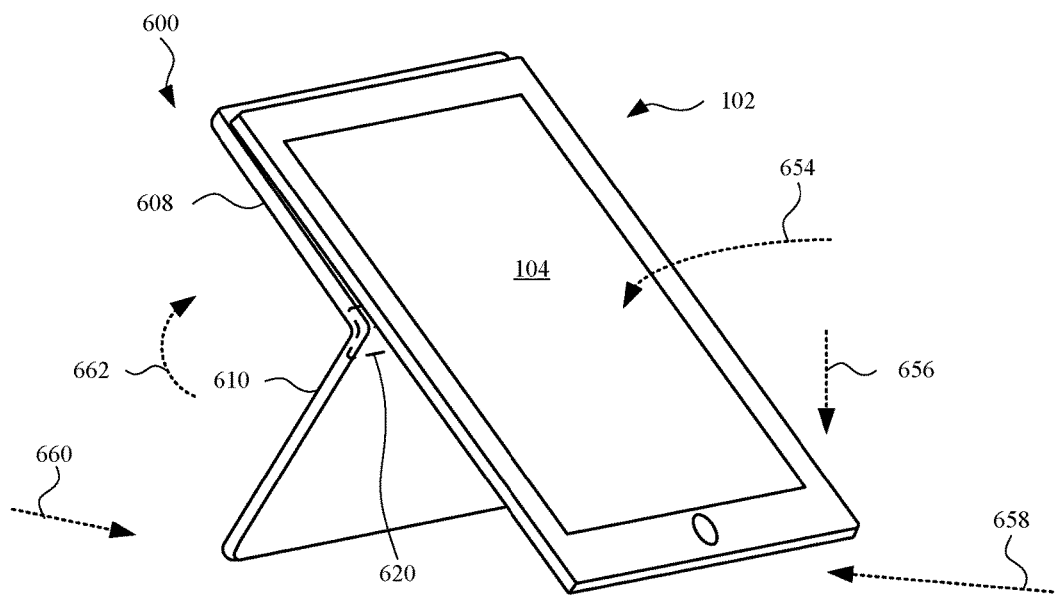
FIG. 6A illustrates a front perspective view of an embodiment of a case that is attached to a back surface of the computing device, with the back surface opposite the display, in accordance with some described embodiments.

FIG. 6A illustrates a front perspective view of an embodiment of a case 600 that is attached to a back surface of the computing device 102, with the back surface opposite the display 104, in accordance with some described embodiments. The case 600 can include a first portion 608 that includes one or more panels and a second portion 610 that also includes one or more panels. The case 600 may further include a flexible region 620 disposed between the first portion 608 and the second portion 610. The flexible region 620 can include one or more springs as discussed herein, and/or one or more layers of flexible material that act as a spring embedded between layers that define the first portion 608 and the second portion 610.

Figure 6B:
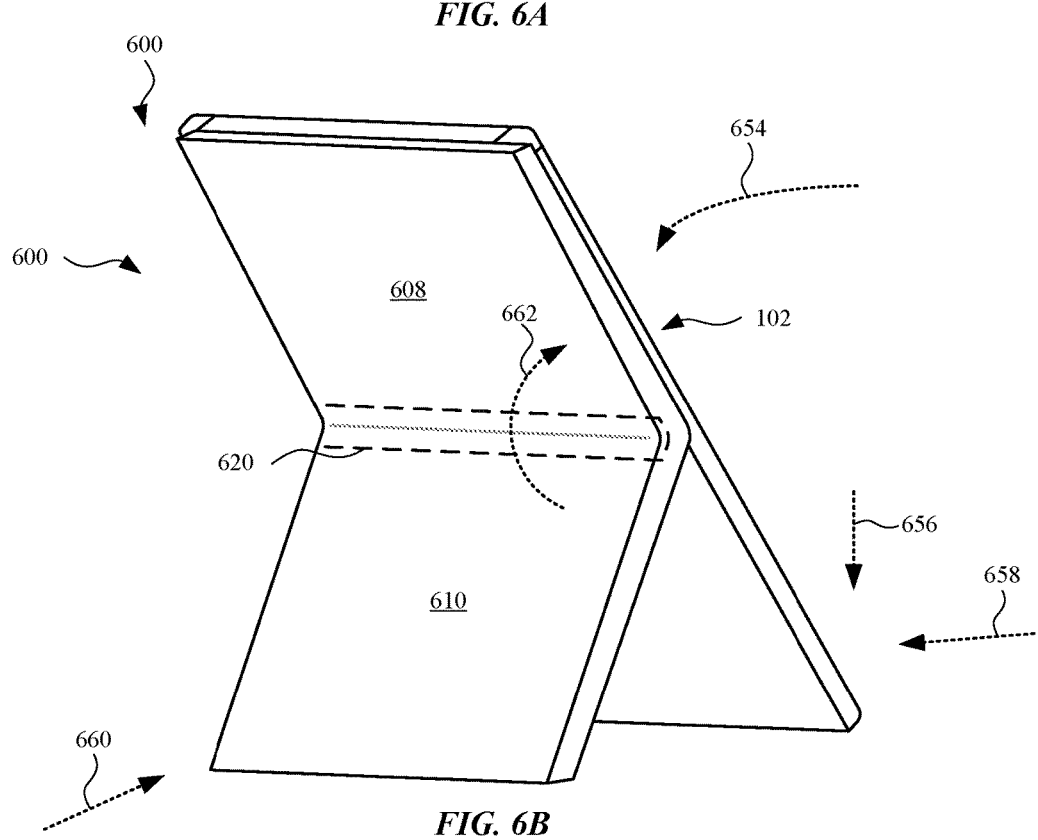
FIG. 6B illustrates a rear isometric view of the case shown in FIG. 6A.

FIG. 6B illustrates a rear isometric view of the case 600 shown in FIG. 6A. The flexible region 620 can provide a torsional force 662 (also labeled in FIG. 6A) that can at least partially cancel a touch force 654 (also labeled in FIG. 6A) that is carried through the computing device 102 to the case 600 when a user touches the display 104 (shown in FIG. 6A). By canceling out the touch force 654, a user is able to arrange the case 600 such that the case 600 positions the computing device 102 upright without concern for the computing device 102 tipping over when the user is tapping on the display 104. Furthermore, the torsional force 662 can at least partially cancel a static force 656 exhibited by the computing device 102 due to the weight of the computing device 102. In this way, a first frictional force 658 and/or a second frictional force 660 (also labeled in FIG. 6A) need not be primarily relied upon for maintaining an angle of the computing device 102 relative to a surface on which the computing device 102 and the case 600 are resting. As a result, the case 600 and the computing device 102 can be placed on nearly any surface and maintain any configuration while receiving reasonable touch input forces from a user.

Figure 7:
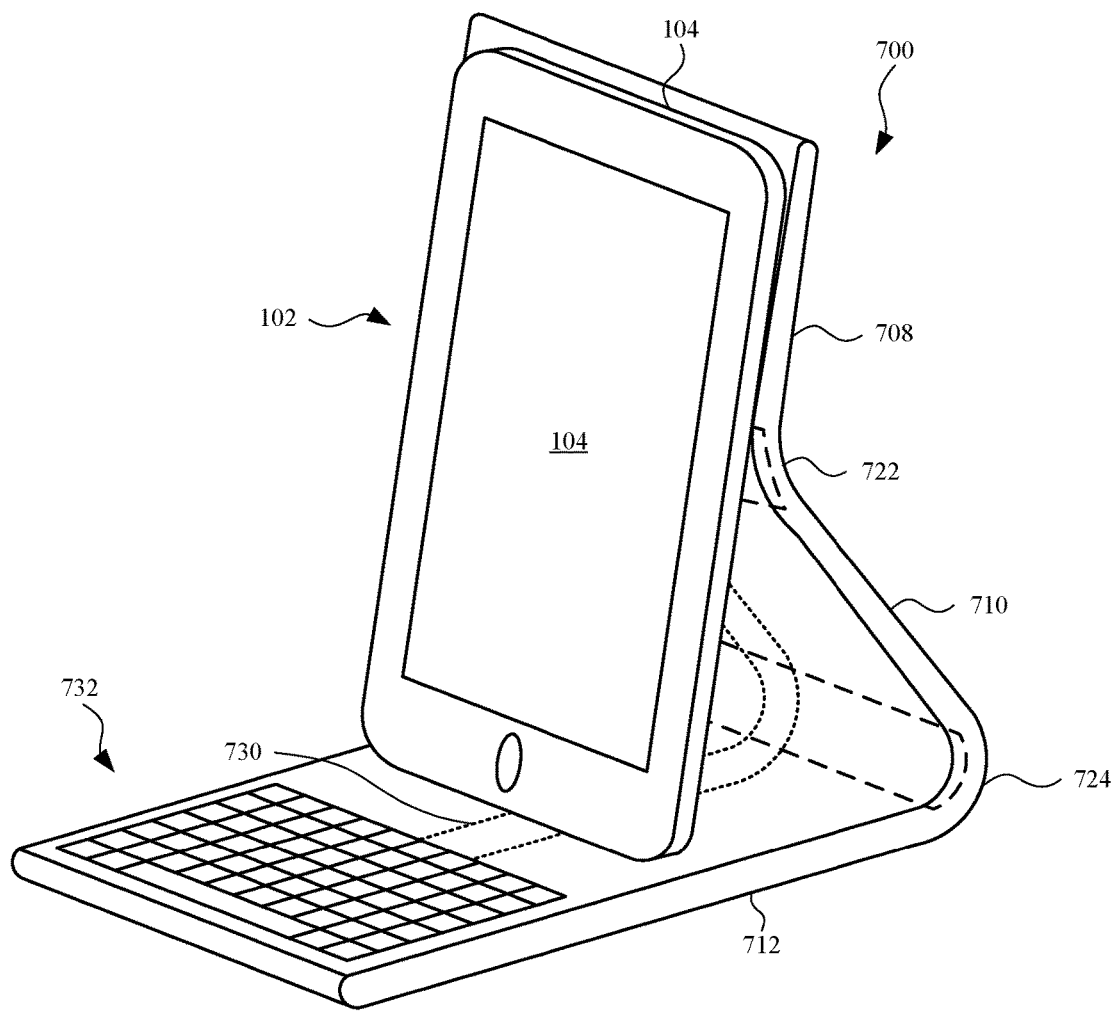
FIG. 7 illustrates a perspective view of an embodiment of a case that can include one or more flexible regions and conductive pathways for operating electrical components embedded in the case 700, in accordance with some described embodiments.

FIG. 7 illustrates a perspective view of an embodiment of a case 700 that can include one or more flexible regions and conductive pathways for operating electrical components embedded in the case 700, in accordance with some described embodiments. The case 700 can include a first back cover 708 and a second back cover 710. The case 700 can further include a front cover 712 that acts as a support for the computing device 102 when the computing device 102 is arranged in an at least partially upright position, as shown in FIG. 7. The case 700 may further include a first flexible region 722 disposed between the first back cover 708 and the second back cover 710, as well as second flexible region 724 disposed between the second back cover 710 and the front cover 712. Each of the first flexible region 722 and the second flexible region 724 can be understood and modified according to any of the embodiments provided herein.

The case 700 can also include a conductive pathway 730 created by one or more flexible conductive layers disposed within the case 700. The conductive pathway 730 can extend through the first flexible region 722 and/or the second flexible region 724. Additionally, the conductive pathway 730 can connect (which may include an electrical connection) to the computing device 102 at one or more edges of the computing device 102, or a back surface of the computing device 102. The case 700 can be adhered to the computing device 102, magnetically coupled to the computing device 102, or otherwise attached to the computing device 102 by way of friction between the computing device 102 and the case 700. Electrical signals traveling through the case 700 can be wirelessly transmitted between inductors located in the computing device 102 and the case 700. In some embodiments, the case 700 may include a keyboard 732 embedded in the case 700 and electrically coupled to the conductive pathway 730. In this way, a user can type on the keyboard 732 and control applications executing on the computing device 102 by way of signals traveling via the conductive pathway 730. The keyboard 732 can receive power by the computing device 102, by way of an internal power supply (not shown), or battery, within the computing device 102. Alternatively, the case 700 may include an internal power supply (not shown). Still, as an additional alternative, an auxiliary power supply (not shown) connected to the case 700 and an external power source, such as an outlet or another computing device. In some embodiments, the case 700 can include electrical components in place of or in addition to the keyboard 732. For example, such electrical components can include a speaker, microphone, wireless transmitter, touch pad, heating pad or cooling pad, camera, processor, radio-frequency identification (RFID) tag, and/or any other electrical component.

Figure 8A:
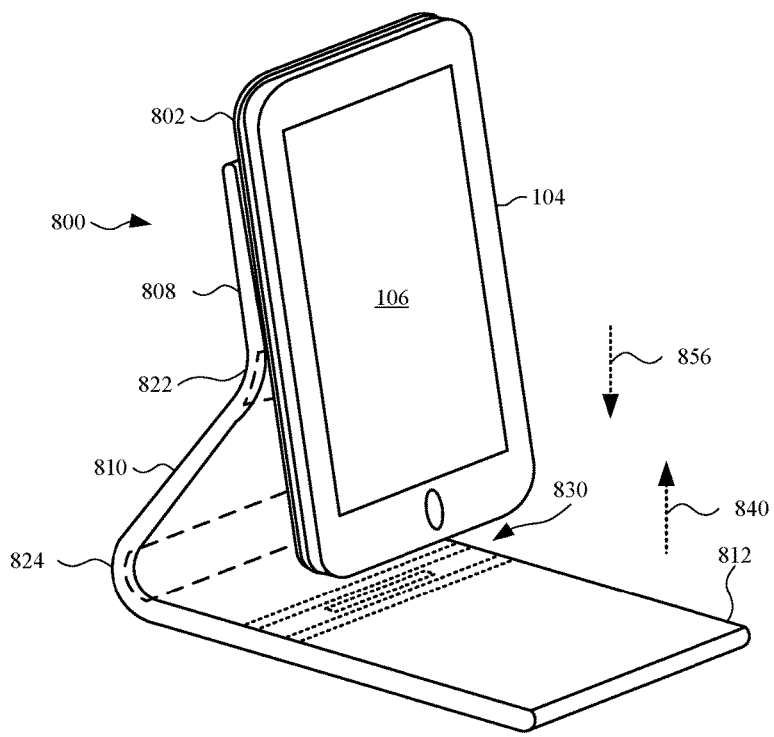
FIG. 8A illustrates a front perspective view of an embodiment of a case that includes magnets for creating a magnetic trough in which the computing device can hover above as a result of magnetic repulsion and at least one or more flexible regions of the case, in accordance with some described embodiments.

FIG. 8A illustrates a front perspective view of an embodiment of a case 800 that includes magnets for creating a magnetic trough in which the computing device 102 can hover above as a result of magnetic repulsion and at least one or more flexible regions of the case 800. The case 800 can include a panel 802 that is connected to at least a first back cover 808 and/or a second back cover 810 of the case 800. The case 800 may further include a front cover 812. The case 800 may further include a first flexible region 822 disposed between the first back cover 808 and the second back cover 810, as well as second flexible region 824 disposed between the second back cover 810 and the front cover 812. Also, the front cover 812 may include a first magnetic assembly 830 that includes one or more magnets (shown as dotted lines). The first magnetic assembly 830 will be further discussed below. Also, the first magnetic assembly 830 may be hidden by the front cover 812.

Figure 8B:
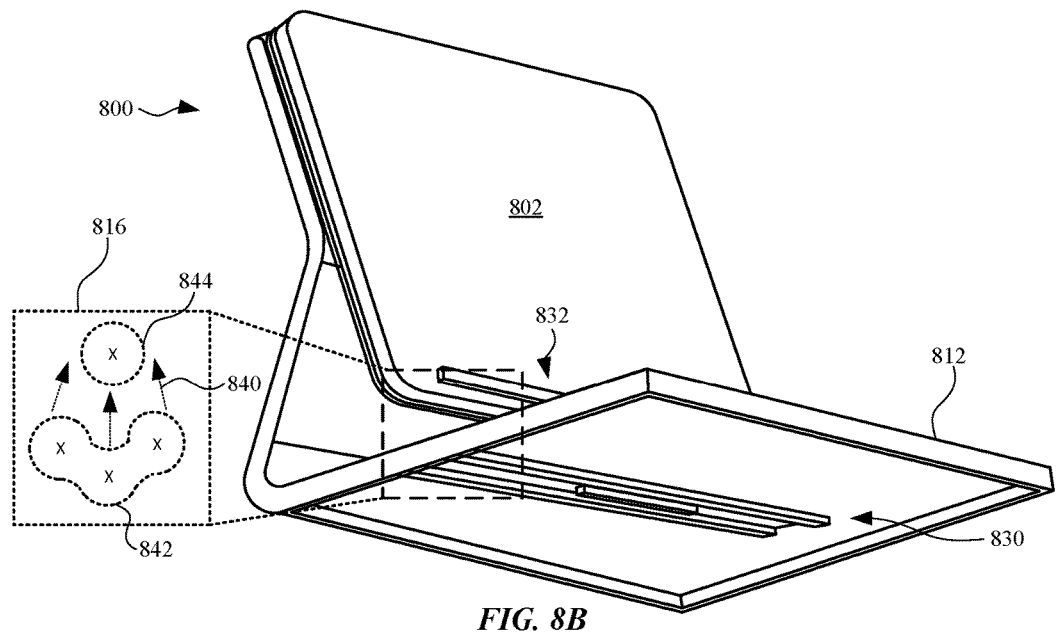
FIG. 8B illustrates a front perspective view of the case shown in FIG. 8A, with the computing device removed from the case.

FIG. 8B illustrates a front perspective view of the case 800 shown in FIG. 8A, with the computing device 102 removed from the case 800. Also, a bottom portion of the front cover 812 is removed for purposes of illustration. As shown, the panel 802 can include a second magnetic assembly 832 that includes one or more magnets designed to magnetically the magnets of the first magnetic assembly 830 disposed in the front cover 812. The first magnetic assembly 830 and the second magnetic assembly 832 can be arranged such that their respective external magnetic fields are pointing in substantially the same direction. For example, FIG. 8B illustrates a magnetic field view 816 that provides a simplified view of an arrangement of the magnetic fields created by the first magnetic assembly 830 and the second magnetic assembly 832, when the second magnetic assembly 832 hovers over the first magnetic assembly 830. The first magnetic assembly 830 can create a first magnetic field 842 and second magnetic assembly 832 can create a second magnetic field 844. Because the first magnetic field 842 and the second magnetic field 844 are arranged in similar directions (as indicated by the "x," which is provided to resemble the back of an arrow that points in the direction of the magnetic field vector lines), the first magnetic assembly 830 and the second magnetic assembly 832 will repel each other by way of a magnetic repulsion force 840 (also shown in FIG. 8A). Furthermore, because the case 800 includes a first flexible region 822 and a second flexible region 824 that can at least partially cancel out a static load 856 (shown in FIG. 8A) created by a weight of the computing device 102, the magnetic repulsion force 840 will cause the computing device 102 to hover over the first magnetic assembly 830, which acts as a magnetic trough. The first magnetic assembly 830 can be arranged such that at least two magnets extend parallel to an edge of the computing device 102 nearest the first magnetic assembly 830 when the computing device 102 is arranged over the front cover 812. In some embodiments, at least three of first magnetic assembly 830 can be arranged within the front cover 812, and at least two of magnets of the first magnetic assembly 830 can have different size magnetic fields. For example, a magnet of the first magnetic assembly 830 can be arranged between two larger magnets of the first magnetic assembly 830 to create a magnetic trough for an edge of the computing device 102 to reside and hover above. A distance by which the computing device 102 can hover above the front cover can be one or more millimeters, centimeters, or inches in some embodiments.

Figure 9:
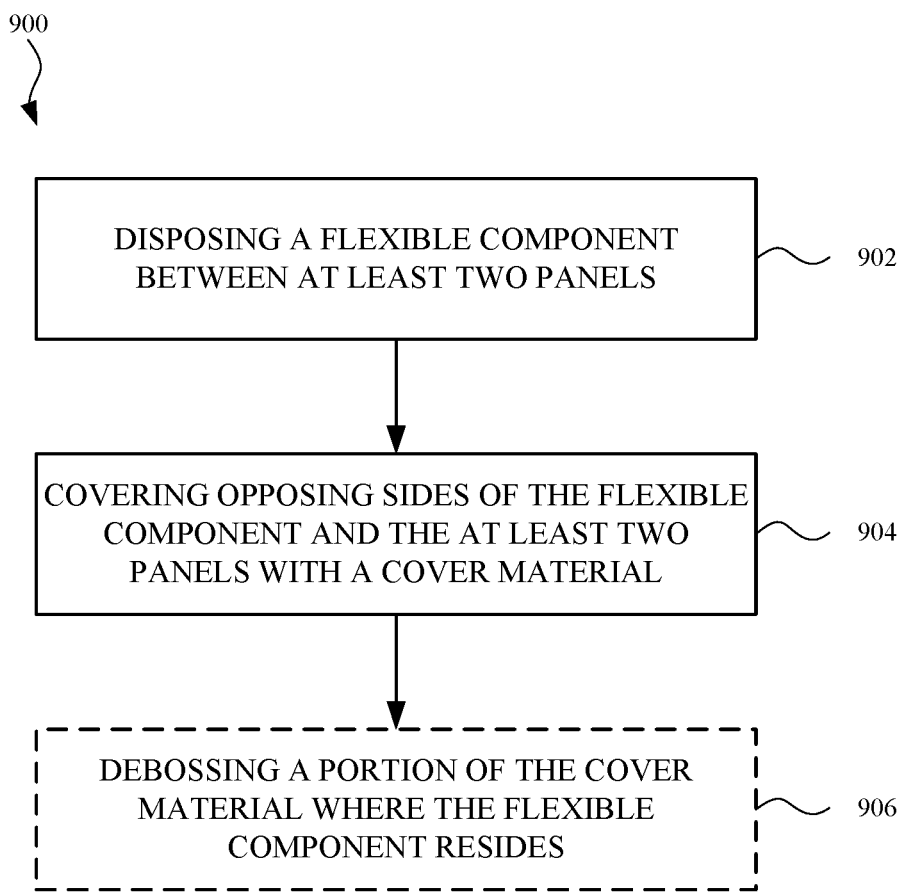
FIG. 9 illustrates a flowchart showing a method for forming a case, in accordance with some described embodiments.

FIG. 9 illustrates a flowchart 900 showing a method for forming a case, in accordance with some described embodiments. In this regard, the case may include any case discussed herein. The method can be performed by a computing device or any apparatus suitable for performing manufacturing operations. Furthermore, the method can be modified according to any of the embodiments discussed herein. The method can include a step 902 of disposing a flexible component between at least two panels. The flexible component can be a spring or flexible layer of material that acts as a spring. The two panels can be set against, adhered to, or formed to the flexible component.

The method can further include a step 904 of covering opposing sides of the flexible component and the at least two panels with a cover material. The cover material can include leather, imitation leather, microfiber, rubber, plastic, metal, and/or any other suitable cover material. Furthermore, different types of materials can be connected to different sides of the two panels and the flexible component.

The method can also include an optional step 906 of debossing a portion of the cover material where the flexible component resides. Debossing can be performed using pressure and/or heat in order to create depression in the cover material where the flexible component resides.

In some embodiments a case is set forth that includes at least two cover portions configurable as a stand for the computing device. The case can also include a flexible region between the at least two cover portions. The flexible region can be configured to provide a torsional force that counteracts at least some amount of static weight of the computing device when the at least two cover portions are configured as the stand. The flexible region can be configured to counteract a static force exerted by the computing device using a torsional force exerted by the flexible region, and the torsional force exerted by the flexible region can increase as the static force exerted by the computing device increases. The static force exerted by the computing device can change based on an angle of the computing device relative to a surface on which the cover portions and the computing device are capable of resting. The flexible region can include one or more springs configured to provide the torsional force. The case can also include a secondary flexible region disposed within a cover portion of the at least two cover portions, wherein the cover portion includes a first cover and a second cover, and the secondary flexible region is disposed between the first cover and the second cover. Furthermore, the secondary flexible region can be configured to provide a secondary torsional force that counteracts dynamic forces associated with a touch input at the computing device when the at least two cover portions are configured as the stand. Additionally, the flexible region can include one or more layers of a flexible elastomer material, and the one or more layers of flexible elastomer material can extend into at least a portion of a cover of the at least two cover portions. The cover can be debossed at a region of the cover that includes the one or more layers of flexible material. The at least two cover portions include at least one of a leather layer, an imitation leather layer, a microfiber layer, a metal layer, and/or a combination thereof.

In other embodiments, a case configurable as a stand for a computing device is set forth. The case can include a first cover comprising a first flexible region and at least one cover layer disposed over the first flexible region; and a second cover connected to the first cover by at least a second flexible region. The first flexible region and the second flexible region can be configured to provide torsional forces that counteract a weight of the computing device when the first cover and the second cover are arranged as the stand for the computing device. The first flexible region and/or the second flexible region include an elastic joint configured to counteract the weight of the computing device and a frictional joint configured to counteract dynamic loads exerted by the computing device. The first cover can include one or more magnets for attaching the first cover to the computing device. The at least one cover layer can include at least one debossed region over a portion of the first flexible region. Additionally, the first cover can include at least two panels disposed on opposite sides of the first flexible region. Furthermore, a panel of the at least two panels can be configured to extend away from the computing device when the first cover and the second cover are arranged as the stand for the computing device. A torsional force of the first flexible region can be configured to counteract user input forces at a touch screen of the computing device when the first cover and the second cover are arranged as the stand. The torsional forces can include a first torsional force that acts in a first radial direction, and a second torsional force that acts in a second radial direction opposite the first radial direction.

In yet other embodiments a system is set forth. The system can include a device cover configurable as a stand and a protective cover for a computing device; and at least one flexible component disposed within the device cover such that the at least one flexible component provides a torsional spring force that counteracts a standing weight and dynamic mechanical loads of the computing device when the device cover is configured as a stand. The at least one flexible component can include a first flexible component arranged adjacent to an edge of the computing device when the device cover is configured as the protective cover, and a second flexible component arranged over a surface of the computing device when the device cover is configured as the protective cover. The device cover can include at least one single layer of material that conceals and extends over both of the first flexible component and the second flexible component. Furthermore, the first flexible component and the second flexible component can be configured to provide opposing torsional spring forces in opposing radial directions when the device cover is arranged as the stand for the computing device. Additionally, an interior surface of the device cover can be configured to support an edge of the computing device when the device cover is configured as the stand and the computing device is arranged at any angle between 90 and 30 degrees relative to the interior surface.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings. Furthermore, some or all features of each of the embodiments described herein can be combined and/or included into other embodiments to create additional embodiments.

What is claimed is:

1. A case for a computing device, the computing device having a housing with a back surface that is opposite to a full front opening and a display overlaid by a protective layer disposed within the full front opening, the case comprising:
    a single piece flap capable of covering the back surface and having a first portion and a second portion separated from each other by a flexible region, the flexible region having a variable torsional element capable of providing a torque that varies in accordance with an angular relationship between the first and second portions such that the computing device is supportable by the single piece flap at generally any angle with respect to a support surface.

2. The case of claim 1, wherein the second portion is pivotable with respect to the first portion so that the second portion is capable of pivoting away from the back surface to define an angle between the second portion and the back surface, and wherein the angular relationship corresponds to the angle.

3. The case of claim 2, wherein the torque increases with an increase of the angle.

4. The case of claim 1,
    wherein the single piece flap further comprises a third portion pivotally coupled to the second portion, wherein the third portion is configurable to cover the protective layer of the computing device.

5. The case of claim 4, further comprising a secondary flexible region positioned between the second portion and the third portion, wherein the secondary flexible region is configured to provide a secondary torsional force that counteracts dynamic forces associated with a touch input at the computing device when the computing device is supported by the single piece flap.

6. The case of claim 1, wherein the flexible region includes one or more layers of a flexible elastomer material.

7. The case of claim 6, wherein the one or more layers of the flexible elastomer material extend into at least a portion of a cover of the second portion, and the cover includes a panel that abuts the one or more layers of the flexible elastomer material.

8. The case of claim 1, wherein the second portion include at least one of a leather layer, an imitation leather layer, a microfiber layer, a metal layer, and/or a combination thereof.

9. A case configurable as a stand for a computing device, the computing device having a housing with a back surface that is opposite to a full front opening and a display overlaid by a protective layer disposed within the full front opening, the case comprising:
    a back cover capable of covering the back surface, the back cover having a first portion and a second portion separated from the first portion by a flexible region, the flexible region having a variable torsional element capable of providing a torque that varies in accordance with an angular relationship between the first and second portions; and
    a front cover pivotally coupled to the second portion of the back cover, the front cover capable of covering the protective layer,
    wherein, when the case is configured as the stand, the front cover is positioned below the computing device, an edge of the computing device is in contact with the front cover and is movable relative the front cover such that the computing device is supportable by the case at generally any angle with respect to the front cover.

10. The case of claim 9, wherein the flexible region includes an elastic joint configured to counteract a weight of the computing device and a frictional layer configured to counteract dynamic loads exerted by the computing device.

11. The case of claim 9, wherein a cover layer of the flexible region includes a debossed region.

12. The case of claim 9, further comprising a second flexible region positioned between the front cover and the second portion of the back cover, the second flexible region being capable of provide a second torque that resists a pivot movement of the second portion with respect to the front cover.

13. The case of claim 12, wherein the torque acts in a first radial direction, and the second torque that acts in a second radial direction opposite the first radial direction.

14. The case of claim 9, wherein the front cover carries a keyboard.

15. The case of claim 14, wherein the torque is capable of counteracting user input forces at a touch screen of the computing device when the case is arranged as the stand.

16. A system comprising:
    a computing device having a housing with a back surface that is opposite to a full front opening and a display overlaid by a protective layer disposed within the full front opening; and
    a stand supporting the computing device relative to a resting surface, the stand comprising a first portion in contact with the back surface, a second portion capable of pivotally extending away from the back surface, and a flexible component pivotally coupling the first portion and the second portion, wherein the flexible component provides a variable torque that counteracts static and dynamic forces of the computing device and the variable torque increases as an angle between the second portion and the back surface increases.

17. The system as recited in claim 16, wherein the stand is configurable as a protective cover such that the first portion and the second portion cooperate to cover the back surface.

18. The system as recited in claim 17, wherein the stand further comprises a secondary flexible component pivotally coupling the second portion to a third portion, wherein:
the flexible component is arranged over the back surface of the computing device when the stand is configured as the protective cover; and
the secondary flexible component is arranged adjacent to an edge of the computing device when the stand is configured as the protective cover.

19. The system as recited in claim 18, wherein a surface of the third portion is configured to support an edge of the computing device and the computing device is arranged at any angle between 30 and 90 degrees relative to the surface.

20. The system as recited in claim 18, wherein the flexible component and the secondary flexible component are configured to provide opposing torques in opposing radial directions.

* * * * *